United States Patent [19]
Thornton

[11] 3,928,071
[45] Dec. 23, 1975

[54] HERMETICALLY SEALED PRIMARY BATTERY

[75] Inventor: Roy F. Thornton, Schenectady, N.Y.

[73] Assignee: General Electric Company, Schenectady, N.Y.

[22] Filed: Oct. 4, 1974

[21] Appl. No.: 512,150

[52] U.S. Cl.............. 136/83 R; 136/20; 136/86 A
[51] Int. Cl.² ........................................ H01M 23/00
[58] Field of Search ............ 136/83 R, 83 T, 100 R, 136/20, 86 A

[56] References Cited
UNITED STATES PATENTS

| | | |
|---|---|---|
| 3,579,382 | 5/1971 | Christopher .......................... 136/20 |
| 3,660,063 | 5/1972 | Christopher ...................... 136/20 X |
| 3,740,206 | 6/1973 | Christopher ...................... 136/20 X |
| 3,762,955 | 10/1973 | Dubin .............................. 136/83 R |
| 3,826,685 | 7/1974 | Dubin et al. ....................... 136/83 R |

*Primary Examiner*—John H. Mack
*Assistant Examiner*—C. F. Lefevour
*Attorney, Agent, or Firm*—Paul R. Webb, II; Joseph T. Cohen; Jerome C. Squillaro

[57] ABSTRACT

A hermetically sealed primary battery is disclosed which includes two glass seals joining two casings and a cap portion together, a sodium type anode in one casing, and a cathode in the other casing.

3 Claims, 1 Drawing Figure

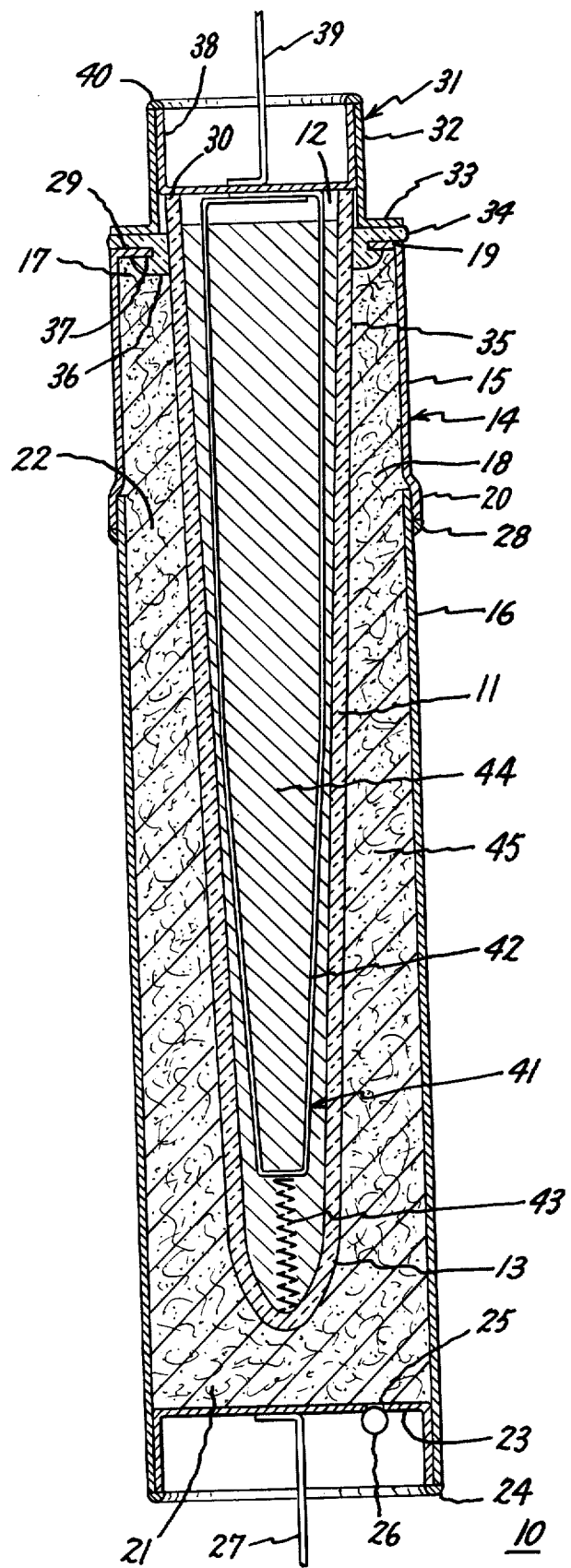

ic material 11 with an open end 12 and a closed end 13. An outer
HERMETICALLY SEALED PRIMARY BATTERY This invention relates to improved hermetically sealed primary batteries and, more particularly, to such batteries with a solid sodium beta-alumina ion-conductive electrolyte.

Sodium-sulfur cells, which operate at elevated temperatures, are known in the prior art as, for example, described in Kummer et al. U.S. Pat. No. 3,404,036 issued Oct. 1, 1968 under the title "Energy Conversion Device Comprising a Solid Crystalline Electrolyte and a Solid Reaction Zone Separator." The solid crystalline ion-conductive electrolyte in the above-mentioned sodium sulfur battery can be sodium beta-alumina.

In U.S. Pat. No. 3,826,685 issued July 30, 1974 in the names of Robert R. Dubin et al. and entitled "Wall Sealed Battery Casing and Sealed Primary Sodium-Halogen Battery," there is described and claimed a battery casing and a sealed primary sodium-halogen battery in which a sodium and halogen resistant glass seals together the adjacent flanges of the outer vessel portions and seals the outer vessel portions to the outer wall of the inner vessel.

In copending application Ser. No. 498,264 filed Aug. 19, 1974 entitled "Battery Casing and Sealed Primary Sodium-Halogen Battery" in the names of Fritz G. Will and Heinrich J. Hess, there is described and claimed a battery casing and a sealed primary sodium-halogen battery wherein the battery casing includes a glass seal sealing the outer casing to the inner casing.

In copending application Ser. No. 428,419 filed Dec. 26, 1973 entitled "Battery Casing and Sealed Primary Sodium-Halogen Battery" in the names of Fritz G. Will and Robert R. Dubin, there is described and claimed a battery casing and a sealed primary sodium-halogen battery wherein the battery casing includes a single glass seal joining together the metallic cap, the inner casing of a solid sodium ion-conductive material, and the outer metallic casing.

The above U.S. Pat. No. 3,826,685 and applications Ser. Nos. 498,264 and 428,419 are assigned to the same assignee as the present application.

In copending application Ser. No. 512,149 filed Oct. 4, 1974 entitled "Battery Casing" in the name of Roy F. Thornton, there is described and claimed an improved battery casing which is incorporated in the present application. This copending patent application is assigned to the same assignee as the present application.

My present invention is directed to providing an improved hermetically sealed primary sodium type anode battery over the above-identified patents and patent applications in that two glass seals join together the metallic cap portion, the inner casing of a solid sodium beta-alumina ion-conductive material, and the outer metallic casing resulting in a hermetically sealed primary battery with strong seals and with the first seal protected by the second seal from corrosive action of the chemicals in the outer casing.

The primary object of my invention is to provide an improved hermetically sealed primary battery.

In accordance with one aspect of my invention, a hermetically sealed primary battery includes two glass seals joining together an inner casing of a sodium beta-alumina ion-conductive material, an outer metallic casing, and a cap portion, a sodium type anode in one casing, and a cathode in the other casing.

These and various other objects, features and advantages of the invention will be better understood from the following description taken in connection with the accompanying drawing in which:

The single FIGURE is a sectional view of a hermetically sealed primary battery made in accordance with my invention.

In the single FIGURE of the drawing, there is shown generally at 10 a hermetically sealed primary battery embodying my invention which has an inner casing of a solid sodium beta-alumina ion-conductive material 11 with an open end 12 and a closed end 13. An outer metallic casing 14 has an upper portion 15 and a lower portion 16. Upper portion 15 has initially opposite open ends 17 and 18. An inwardly extending flange 19 is affixed to upper portion 15 at its first open end 17 and a flare 20 at its open second end 18. Lower portion 16 has initially a first open end 21, a second open end 22, a closure 23 for its first open end 21 welded at 24 to lower portion 16 and an initial opening 25 in closure 23 sealed at 26. An electrical lead 27 is shown welded to the exterior surface of closure 23. Upper and lower portions 15 and 16 are joined together as by welding at 28 at their associated second open ends 18 and 22. Outer metallic casing 14 surrounds inner casing 11 with exterior surface 29 of flange 19 on a lower plane than surface 30 at open end 12 of inner casing 11 and spaced from inner casing 11. A metallic closure 31 consisting of a cap portion 32 with a flange 33 and a cap insert has its flange 33 positioned adjacent to and spaced from flange 19. A first glass seal 34 seals together flange 19 of upper portion 15 of metallic casing 14 and flange 33 of cap portion 32 of metallic closure 31 and seals flanges 19 and 33 to a portion of outer wall 35 of inner casing 11, which portion of outer wall 35 is nearly round and is adjacent open end 12. A second glass seal 36 seals together opposite surface 37 of flange 19 of upper portion 15 of outer metallic casing 14, and a portion of outer wall 35 of the inner casing 11 thereby providing strong seals and protection of the first seal by the second seal from corrosive action of chemicals in the outer casing. Cap insert 38 with an electrical lead 39 welded to its exterior surface is shown positioned within cap portion 32 and welding thereto at 40 thereby closing open end 12 of inner casing 11. An electronic conductor 41 is affixed, as by welding to interior surface of cap insert 38 thereby being positioned within interior surface of inner casing 11. Electronic conductor 41 is shown in the form of a closed wire hairpin 42 with a wire spiral 43 affixed to one end thereof whereby conductor 39 is in contact with closed end 13 of inner casing 11. An anode 44 is positioned preferably in inner casing 11. Anode 44, which is shown as sodium metal, is selected from the class consisting of sodium, sodium as an amalgam or sodium in a nonaqueous electrolyte. A cathode 45, which is shown as a halogen in conductive material is positioned preferably within outer casing 14 and in contact with outer wall 35 of inner casing 11 and with the inner wall of outer casing 14. The resulting structure is a hermetically sealed primary battery embodying my invention. The hermetically sealed primary battery is formed preferably by positioning an inner casing of a solid sodium beta-alumina ion-conductive material having an open end within the upper portion of an outer casing of a suitable, chemically stable material such as tantalum. The upper portion has opposite open ends with an inwardly extending flange affixed at its first open end. The upper portion of the outer casing surrounds partially the inner casing with the exterior surface of its flange on a lower plane than the surface of the open end of the inner casing and the upper portion of the outer casing is spaced from the inner casing. A metallic closure, such as of tantalum, consists of a cap portion with a flange and a cap insert which has the flange of the cap portion positioned adjacent the flange of the upper portion of the outer metallic casing. Other suitable metals can be employed for the outer casing and the metallic closure provided the metal bonded to the glass has approximately the same expansion coefficient and chemical stability toward the material in the outer casing. Two glass washers are positioned, respectively, between the adjacent flanges and in contact with the exterior wall of the inner vessel, and against the opposite surface of outer metallic casing flange, and a portion of the outer wall of the inner casing. Each glass washer is made of a suitable sodium and halogen resistant glass, such as Corning Glass No. 7052, General Electric Company Glass No. 1013, Sovirel Glass No. 747, or Kimble Glass No. N-51A. The glass washers and associated assembly are positioned in an inverted position held by a suitable jig fixture and heated to a temperature in the range of 1175° to 1250°C in an argon atmosphere whereby one glass washer seals together the adjacent flanges of the upper portion of the outer metallic casing and the cap portion of the metallic closure and seals the flanges to the outer wall of the inner vessel adjacent its open end. The second glass washer seals together the opposite surface of the flange of the upper portion of the outer metallic casing and a portion of the outer wall of the inner casing. An amount of mercury is placed within the inner vessel, which amount is the amount required in the sodium amalgam to be used as the anode. The cap insert has an electronic conductor of a material such as tantalum or nickel affixed to its interior surface which is positioned within the interior surface of the inner casing. The preferred form of the conductor is a closed wire hairpin with a wire spiral affixed to its opposite end whereby the spiral contacts the interior surface of the closed end of the inner casing and contacts the mercury therein. The cap insert is then welded to the cap portion. In this manner, the insert seals the open end of the inner casing. The inner casing is then filled with sodium to provide a sodium amalgam anode. This is accomplished in accordance with the method described and claimed in U.S. Pat. No. 3,740,206 issued June 19, 1973. This patent is assigned to the same assignee as the present application.

It will, of course, be appreciated that the sodium, for example, in the form of sodium amalgam can be added directly to the interior of the inner casing before the cap insert is positioned and sealed to the cap portion. Further, other manners of filling the inner casing with a sodium type anode can be employed. A suitable method is to provide a fill opening or fill tube in the cap insert through which the inner casing is filled with the sodium type anode.

The second open end of the upper and lower portions of the outer metallic casing are then welded together. Conductive material is then positioned around and in contact with the exterior surface of the inner casing. For example, carbon felt in the form of washers are slipped around the exterior surface of the inner casing. The closure with an electrical lead welded to its exterior surface and with an opening thereon is then positioned in the first open end of the lower portion. The closure is welded to the lower portion. A mixture of bromine and iodine with from 5 to 60 weight percent iodine with dissolved small amounts of additives is added through the fill opening in the closure of the outer casing thereby providing a cathode within and in contact with the outer casing and in contact with the exterior surface of the inner casing. The fill opening is then closed, for example, by welding. The above cathode is described in U.S. Pat. No. 3,793,080 issued Feb. 19, 1974, which patent is assigned to the same assignee as the present application. The resulting structure is a hermetically sealed primary sodium-halogen battery made in accordance with my invention. Other cathodes are suitable in my battery which function with a sodium type anode and a solid sodium beta-alumina ion-conductive electrolyte. Additional cathodes which I have tested successfully in my battery are thionyl chloride ($SOCl_2$) with a conductivity-enhancing compound of aluminum chloride, and a mixture of bromine with 10.0 weight percent of phosphoryl chloride. A cathode of thionyl chloride with a conductivity-enhancing compound is described and claimed in copending U.S. application Ser. No. 458,098 filed Apr. 5, 1974. A cathode of a mixture of bromine with 10.0 weight percent phosphoryl chloride is described and claimed in copending U.S. application Ser. No. 455,150 filed Mar. 27, 1974. Both of these applications are assigned to the same assignee as the present application.

Examples of hermetically sealed primary batteries made in accordance with my invention are as follows:

EXAMPLE I

Sixty-seven hermetically sealed primary batteries were formed in accordance with my invention as above-described and as shown in the single FIGURE of the drawing. Each hermetically sealed primary battery was formed by positioning an inner casing of a solid sodium beta-alumina ion-conductive material having an open end within the upper portion of an outer metallic casing of a suitable, chemically stable material of tantalum. The upper portion had opposite open ends with an inwardly extending flange affixed at its first open end. The upper portion of the outer casing surrounded partially the inner casing with the exterior surface of its flange on a lower plane than the surface of the open end of the inner casing and the upper portion of the outer casing was spaced from the inner casing. A metallic closure of tantalum consisted of a cap portion with a flange and a cap insert which had the flange of the cap portion positioned adjacent the flange of the upper portion of the outer metallic casing. Two glass washers were positioned, respectively, between the adjacent flanges and in contact with the exterior wall of the inner vessel, and against the opposite surface of the outer metallic casing flange, and a portion of the outer wall of the inner casing. Each glass washer was made of a suitable sodium and halogen resistant glass of Kimble Glass No. N-51A. The glass washers and associated assembly were positioned in an inverted position held by a suitable jig fixture and heated to a temperature of 1,250°C in an argon atmosphere whereby one glass washer sealed together the adjacent flanges of the upper portion of the outer metallic casing and the cap portion of the metallic closure and sealed the flanges to the outer wall of the inner vessel adjacent its open end. The second glass washer sealed together the opposite surface of the flange of the upper portion of the outer metallic casing and a portion of the outer wall of the inner casing. 0.62 grams of mercury was placed within the inner vessel, which amount was the amount required in the sodium amalgam to be used as the anode.

Thirty-three of the cap inserts each has an electronic conductor of tantalum affixed to its interior surface which was positioned within the interior surface of the inner casing. The remaining 34 cap inserts each had a nickel electronic conductor. The conductor was a closed wire hairpin with a wire spiral affixed to its opposite end whereby the spiral contacted the interior surface of the closed end of the inner casing when positioned within the inner casing and contacted the mercury therein. The cap insert was then welded to the cap portion. In this manner, the insert sealed the open end of the inner casing. The inner casing was then filled with sodium to provide a sodium amalgam anode. This was accomplished in accordance with the method described and claimed in U.S. Pat. No. 3,740,206 issued June 19, 1973. This patent is assigned to the same assignee as the present application.

The second open end of the upper and lower portions of the outer metallic casing were then welded together. Conductive material was then positioned around and in contact with the exterior surface of all of the respective inner casings. This was accomplished by using carbon felt in the form of washers which were slipped around the exterior surface of the respective inner casings. The closure with an electrical lead welded to its exterior surface is then positioned in the first open end of the lower portion. The closure was welded to the lower portion. The cathode was then added through the fill opening in the closure of the outer casing thereby providing a cathode within and in contact with the outer casing and in contact with the exterior surface of the inner casing. The fill opening was then closed by welding.

Of the 67 hermetically sealed primary batteries made above in Example I, 20 employed a cathode (Type 1) comprising a mixture of 89.0 weight percent bromine, 10.0 weight percent iodine, 0.5 weight percent water, and 0.5 weight percent sodium bromide in the outer casing with carbon felt therein. Twenty-five batteries employed a cathode (Type 2) of thionyl chloride with a conductivity-enhancing compound of aluminum chloride with carbon felt. Twenty-two batteries employed a cathode (Type 3) of a mixture of bromine with 25.0 weight percent of phosphoroxychloride with carbon felt.

EXAMPLE II

Of the 20 batteries employing the above-identified Type 1 cathode, one such battery at room temperature exhibited the following polarization behavior which is shown below in Table I.

TABLE I

| Current Density- ma/cm$^2$ | Voltage- Volts |
|---|---|
| 0 | 3.56 |
| $10^{-2}$ | 3.32 |
| $10^{-1}$ | 3.18 |
| $5 \times 10^{-1}$ | 3.03 |
| 1 | 2.87 |

EXAMPLE III

Of the 25 batteries employing the above-identified Type 2 cathode, one such battery at room temperature exhibited the following polarization behavior which is shown below in Table II.

TABLE II

| Current Density- ma/cm$^2$ | Voltage- Volts |
|---|---|
| 0 | 4.03 |
| $10^{-2}$ | 3.57 |
| $10^{-1}$ | 3.13 |
| $5 \times 10^{-1}$ | 2.86 |
| 1 | 2.53 |

EXAMPLE IV

Of the 22 batteries employing the above-identified Type 3 cathode, one such battery at room temperature exhibited the following polarization behavior which is shown below in Table III.

TABLE III

| Current Density- ma/cm$^2$ | Voltage- Volts |
|---|---|
| 0 | 3.53 |
| $10^{-2}$ | 3.53 |
| $10^{-1}$ | 3.02 |
| $5 \times 10^{-1}$ | 2.91 |
| 1 | 2.67 |

While other modifications of the invention and variations thereof which may be employed within the scope of the invention have not been described, the invention is intended to include such as may be employed within the following claims:

What I claim as new and desire to secure by Letters Patent of the United States is:

1. A hermetically sealed primary battery comprising an inner casing of a solid sodium beta-alumina ion-conductive material with one open end, an outer metallic casing comprising an upper portion and a lower portion, the upper portion with opposite open ends, an inwardly extending flange affixed to the upper portion at its first open end, the lower portion with an open and a closed end, the upper and lower portions sealed together at their associated open ends, the outer metallic casing surrounding the inner casing with the exterior surface of the flange on a lower plane than the surface of the open end of the inner casing and spaced from the inner casing, a metallic closure consisting of a cap portion with a flange and a cap insert, the flange of the cap portion positioned adjacent the flange of the upper portion of the outer metallic casing, a first glass seal sealing together the adjacent flanges of the upper portion of the outer metallic casing and of the cap portion of the metallic closure and sealing the adjacent flanges to the outer wall of the inner casing adjacent its open end, a second glass seal sealing together the opposite surface of the flange of the upper portion of the outer metallic casing and a portion of the outer wall of the inner casing, the cap insert positioned within and sealed to the cap portion thereby closing the open end of the inner casing, an electronic conductor affixed to the interior surface of the cap insert and positioned within the interior surface of the inner casing, an anode selected from the class consisting of sodium, sodium as an amalgam, and sodium in a nonaqueous electrolyte in one of the casings, and a cathode in the other casing, the cathode functioning with a sodium type anode and a solid sodium beta-alumina ion-conductive electrolyte.

2. A hermetically sealed primary battery as in claim 1, in which the anode is in the inner casing.

3. A hermetically sealed primary battery as in claim 1, in which the electronic conductor is in the form of a closed wire hairpin, a wire spiral affixed to one end of the wire hairpin and in contact with interior surface of the closed end of the inner casing, and the anode is in the inner casing.

* * * * *